US012687675B2

(12) United States Patent     (10) Patent No.:   US 12,687,675 B2

Chandran et al.     (45) Date of Patent:     Jul. 21, 2026

(54) PHOTONICS CHIPS INCLUDING A PHOTONIC COUPLER AND A PHOTODETECTOR

(71) Applicant: GlobalFoundries U.S. Inc., Malta, NY (US)

(72) Inventors: Sujith Chandran, Clifton Park, NY (US); Yusheng Bian, Ballston Lake, NY (US); Abdelsalam Aboketaf, Essex Junction, VT (US); Won Suk Lee, Malta, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 254 days.

(21) Appl. No.: 18/535,186

(22) Filed: Dec. 11, 2023

(65) Prior Publication Data

US 2025/0189721 A1     Jun. 12, 2025

(51) Int. Cl.
    *G02B 6/122*     (2006.01)
    *G02B 6/13*     (2006.01)
    *G02B 6/12*     (2006.01)

(52) U.S. Cl.
    CPC ............. *G02B 6/1228* (2013.01); *G02B 6/13* (2013.01); *G02B 2006/12061* (2013.01)

(58) Field of Classification Search
    CPC .................................................... G02B 6/1228
    See application file for complete search history.

(56) References Cited

U.S. PATENT DOCUMENTS

| 8,855,449 | B1 * | 10/2014 | Roth | G02B 6/2773 |
| | | | | 385/11 |
| 9,726,821 | B2 * | 8/2017 | Murray | G02B 6/4212 |
| 2013/0306848 | A1 * | 11/2013 | Dell'Orto | G02F 1/2255 |
| | | | | 250/227.11 |
| 2016/0057516 | A1 * | 2/2016 | Hochberg | H04J 14/02 |
| | | | | 398/139 |
| 2019/0033520 | A1 * | 1/2019 | Lin | G02B 6/1228 |
| 2024/0077674 | A1 * | 3/2024 | Tambasco | G02B 6/14 |

FOREIGN PATENT DOCUMENTS

EP     3561561 A1 * 10/2019 ........... G02B 6/1228

OTHER PUBLICATIONS

J. Cui, H. Chen, J. Zhou and T. Li, "High Performance Ge-on-Si Photodetector With Optimized Light Field Distribution by Dual-Injection," in IEEE Photonics Journal, vol. 14, No. 2, pp. 1-4, Apr. 2022, doi: 10.1109/JPHOT.2022.3153694.

(Continued)

*Primary Examiner* — Charlie Y Peng
(74) *Attorney, Agent, or Firm* — Thompson Hine LLP; Anthony Canale

(57) ABSTRACT

Structures for a photonics chip that include a photodetector and methods of forming such structures. The structure comprises a photodetector, a first waveguide core coupled to the photodetector, and a second waveguide core coupled to the photodetector. The structure further comprises a third waveguide core including a section disposed laterally between a section of the first waveguide core and a section of the second waveguide core.

20 Claims, 8 Drawing Sheets

(56)　　　　　　References Cited

OTHER PUBLICATIONS

A. Chowdhury et al., "High Performance Avalanche Photodiode in a Monolithic Silicon Photonics Technology," 2022 Optical Fiber Communications Conference and Exhibition (OFC), San Diego, CA, USA, 2022, pp. 1-3.

Zhibin Jiang et al., "High-power Si—Ge photodiode assisted by doping regulation," Optics Express 29, 7389-7397 (2021).

Xiao Hu et al., "High-speed and high-power germanium photodetector with a lateral silicon nitride waveguide," Photonics Research 9, 749-756 (2021).

H. Chen et al., "−1 V bias 67 GHz bandwidth Si-contacted germanium waveguide p-i-n photodetector for optical links at 56 Gbps and beyond," Optics Express 24, 4622-4631 (2016).

González-Andrade, D., Lafforgue, C., Durán-Valdeiglesias, E. et al. "Polarization- and wavelength-agnostic nanophotonic beam splitter." Scientific Reports 9, 3604 (2019). https://doi.org/10.1038/s41598-019-40497-7.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.

\* cited by examiner

PHOTONICS CHIPS INCLUDING A PHOTONIC COUPLER AND A PHOTODETECTOR

BACKGROUND

This disclosure relates to photonics chips and, more specifically, to structures for a photonics chip that include a photonic coupler and a photodetector and methods of forming such structures.

Photonics chips are used in many applications and systems including, but not limited to, data communication systems and data computation systems. A photonics chip includes a photonic integrated circuit comprised of photonic components, such as modulators, polarizers, and couplers, that are used to manipulate light received from a light source, such as an optical fiber or a laser. A photodetector may be employed in the photonic integrated circuit to convert light, which may be modulated as an optical signal, into an electrical signal.

Improved structures for a photonics chip that include a photonic coupler and a photodetector and methods of forming such structures are needed.

SUMMARY

In an embodiment of the invention, a structure for a photonics chip is provided. The structure comprises a photodetector, a first waveguide core coupled to the photodetector, and a second waveguide core coupled to the photodetector. The structure further comprises a third waveguide core including a section disposed laterally between a section of the first waveguide core and a section of the second waveguide core.

In an embodiment of the invention, a structure for a photonics chip is provided. The structure comprises a photodetector including a semiconductor layer configured to absorb light of a given wavelength, a first waveguide core including a tapered section adjacent to the semiconductor layer of the photodetector, and a second waveguide core including a tapered section adjacent to the semiconductor layer of the photodetector. The structure further comprises a third waveguide core including a tapered section over the tapered section of the first waveguide core, and a fourth waveguide core including a tapered section over the tapered section of the second waveguide core.

In an embodiment of the invention, a method of forming a structure for a photonics chip is provided. The method comprises forming a photodetector, forming a first waveguide core coupled to the photodetector, forming a second waveguide core coupled to the photodetector, and forming a third waveguide core including a section disposed laterally between a section of the first waveguide core and a section of the second waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
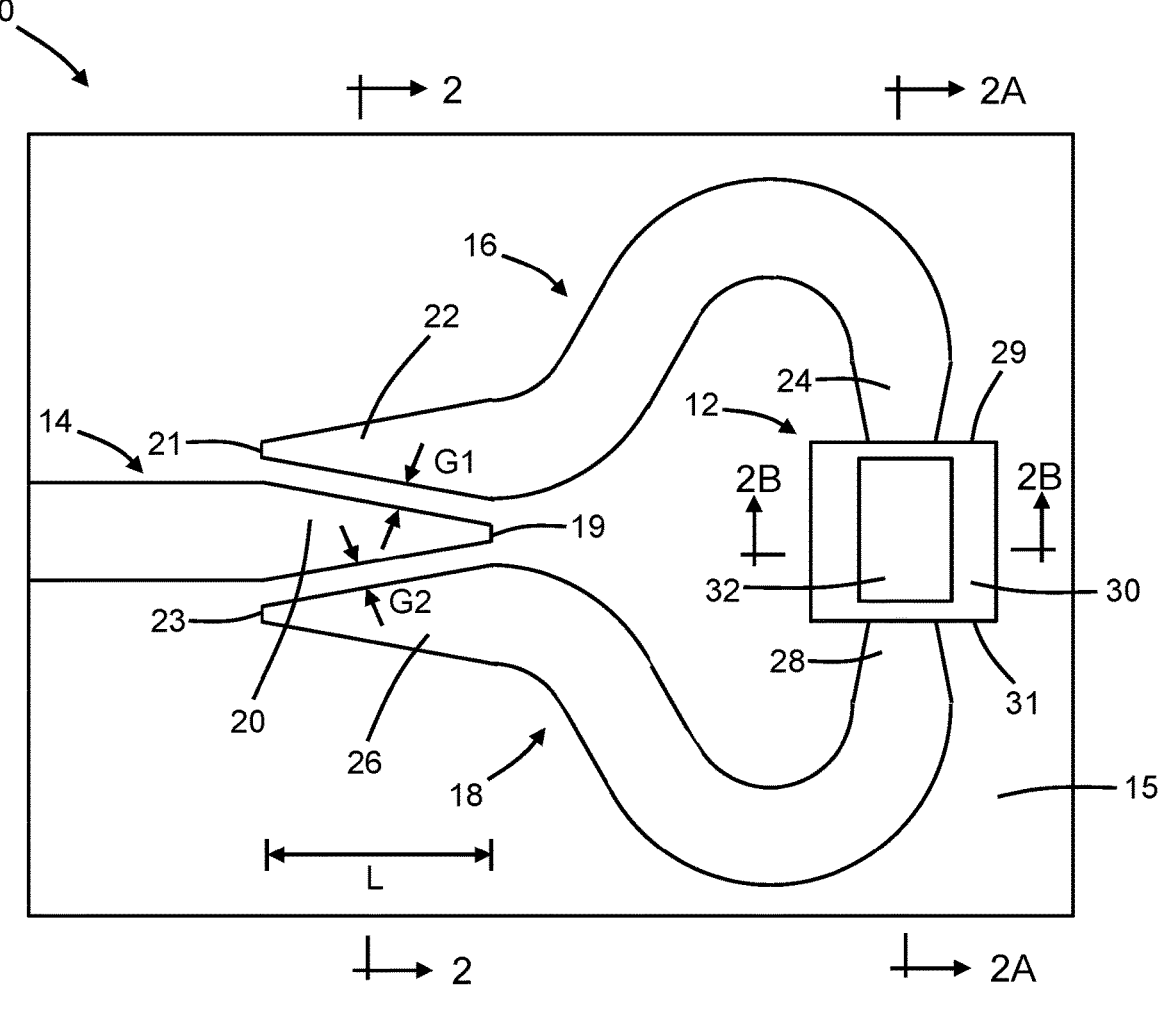
FIG. 1 is a top view of a structure at an initial fabrication stage of a processing method in accordance with embodiments of the invention.
Figure 2:
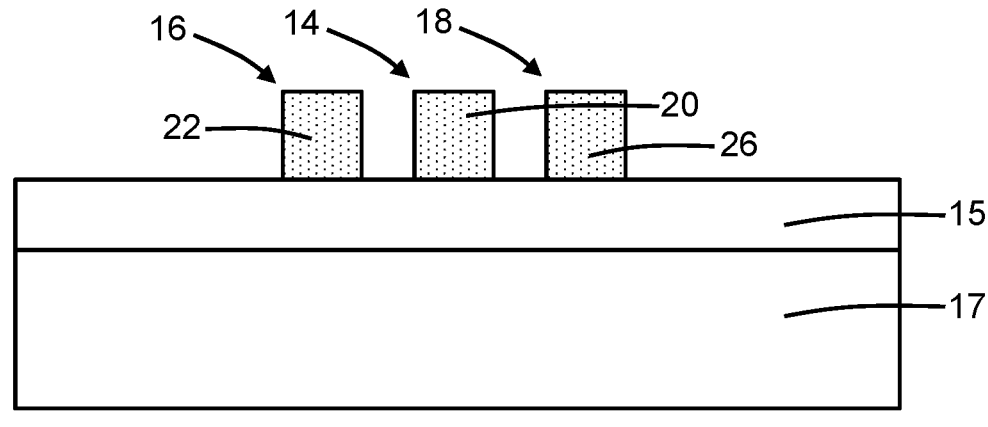
FIG. 2 is a cross-sectional view taken generally along line 2-2 in FIG. 1.
Figure 2A:
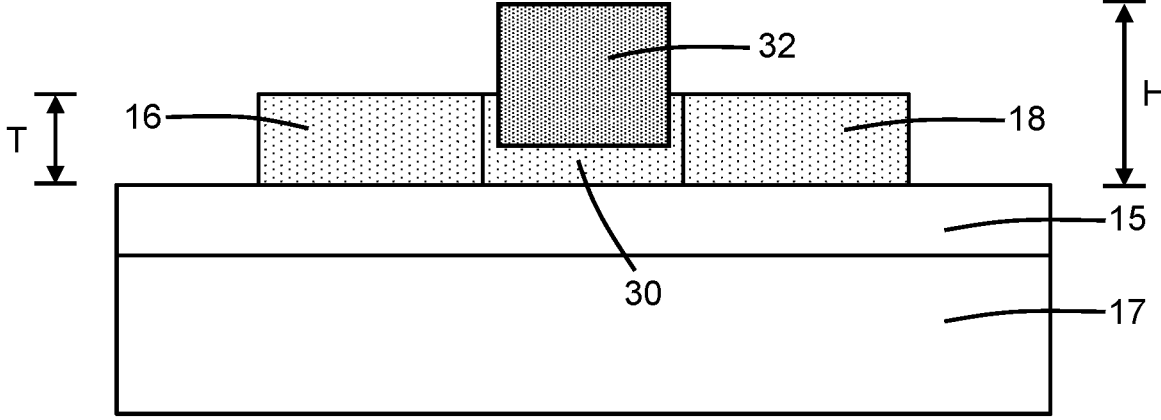
FIG. 2A is a cross-sectional view taken generally along line 2A-2A in FIG. 1.
Figure 2B:
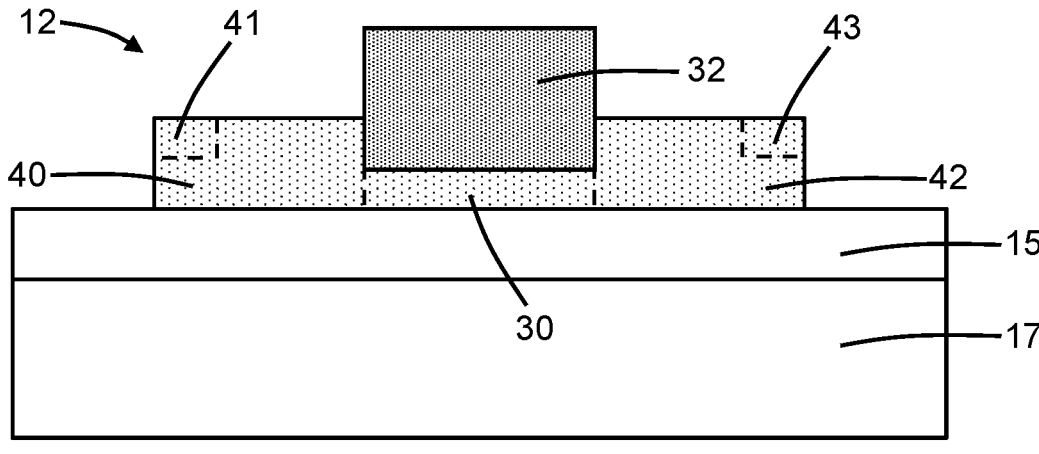
FIG. 2B is a cross-sectional view taken generally along line 2B-2B in FIG. 1.
Figure 3:
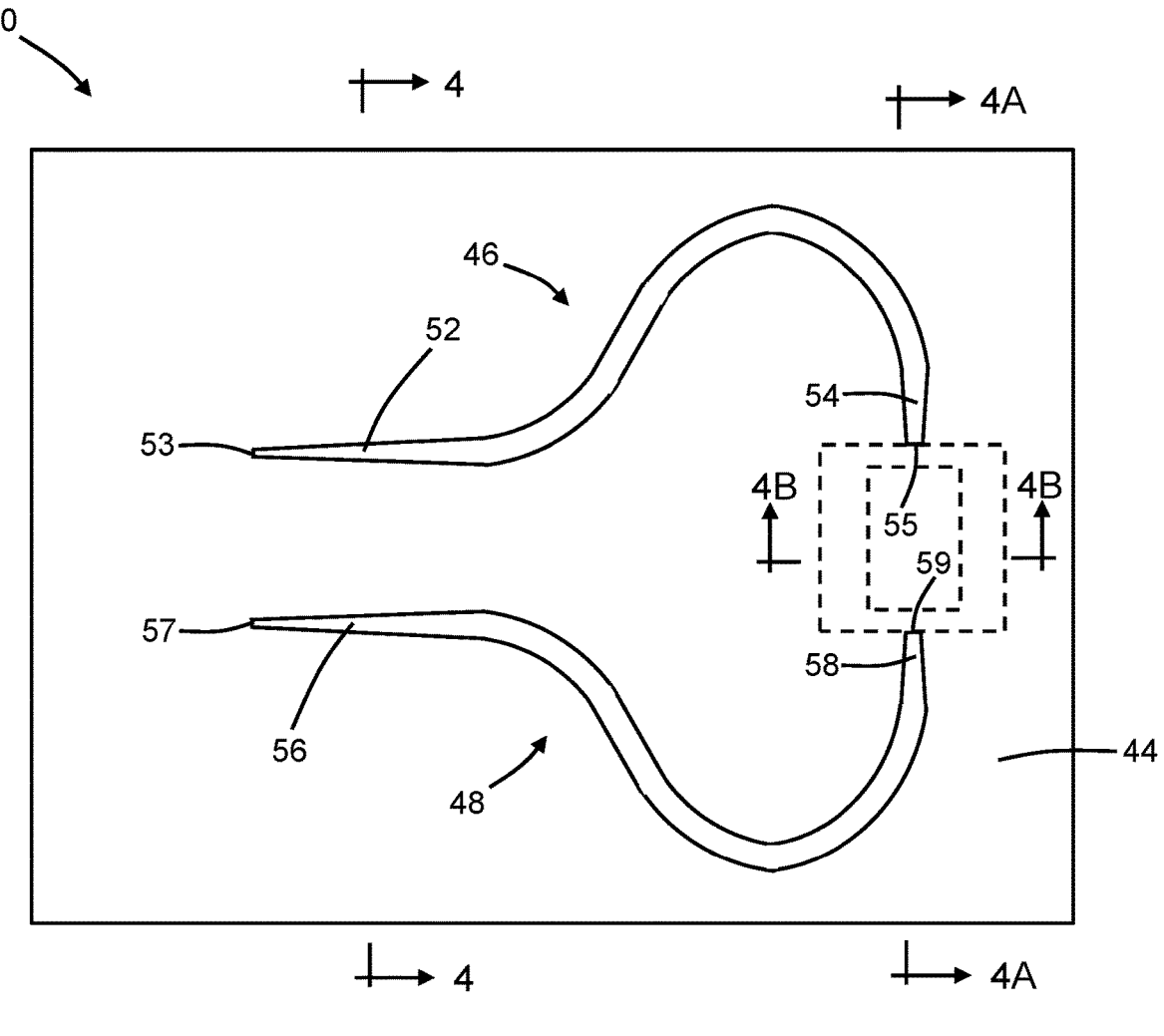
FIG. 3 is a top view of the structure at a fabrication stage of the processing method subsequent to FIGS. 1, 2, 2A, 2B.
Figure 4:
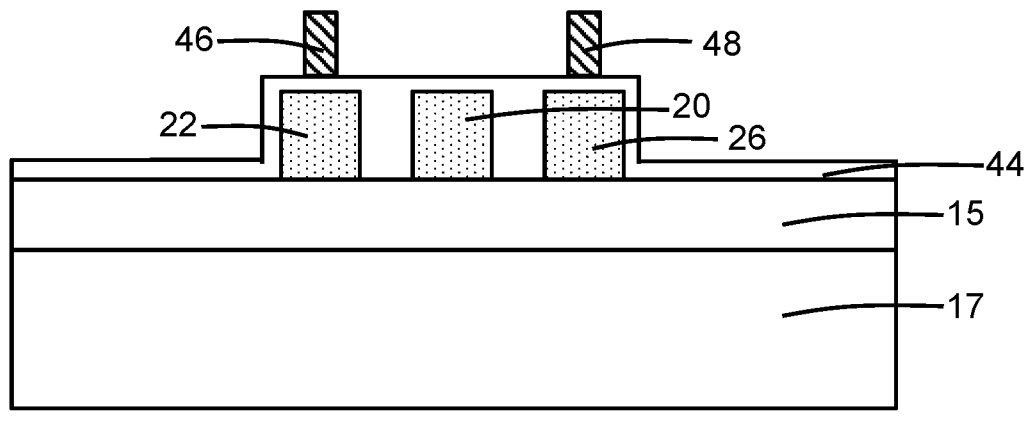
FIG. 4 is a cross-sectional view taken generally along line 4-4 in FIG. 3.
Figure 4A:
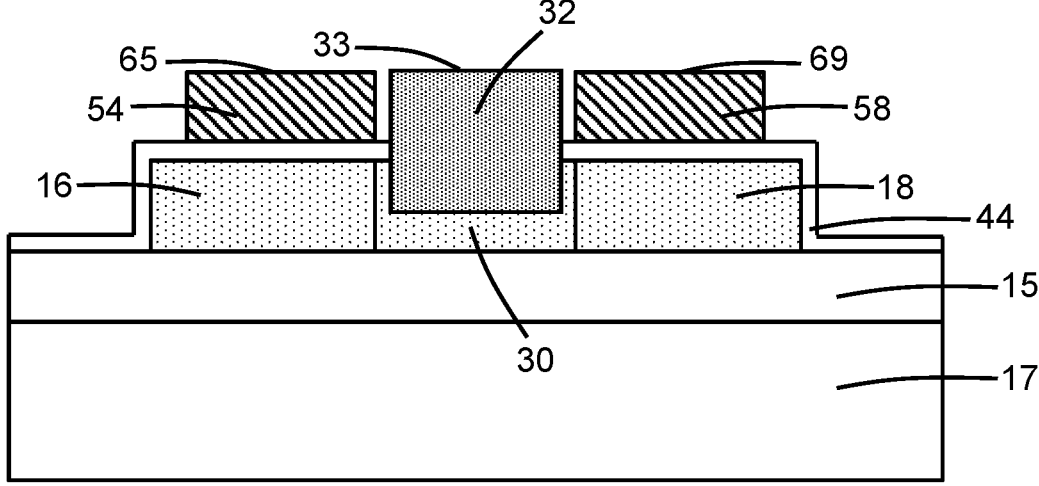
FIG. 4A is a cross-sectional view taken generally along line 4A-4A in FIG. 3.
Figure 4B:
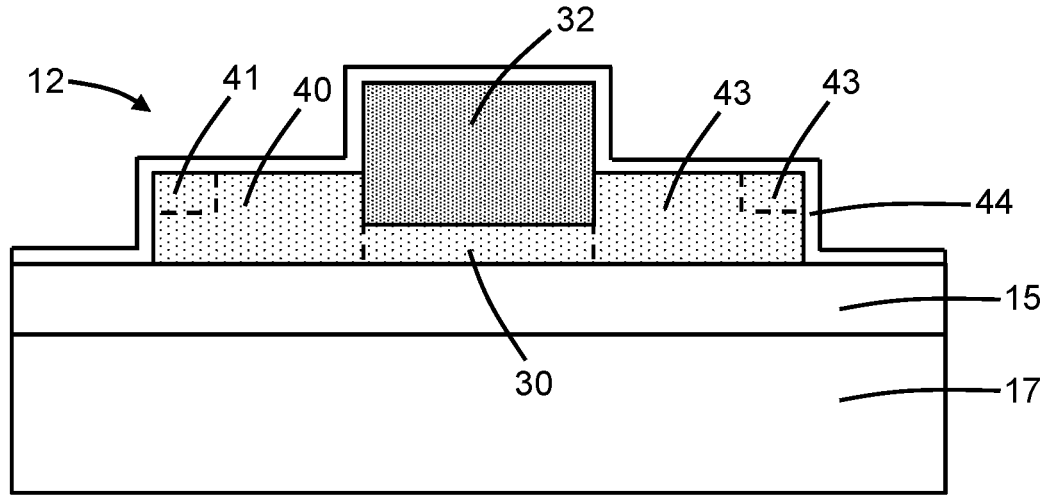
FIG. 4B is a cross-sectional view taken generally along line 4B-4B in FIG. 3.

With reference to FIGS. 1, 2, 2A, 2B and in accordance with embodiments of the invention, a structure 10 for a photonics chip includes a photodetector 12 and waveguide cores 14, 16, 18 that are positioned on, and above, a dielectric layer 15 and a semiconductor substrate 17. In an embodiment, the dielectric layer 15 may be comprised of a dielectric material, such as silicon dioxide, and the semiconductor substrate 17 may be comprised of a semiconductor material, such as single-crystal silicon. In an embodiment, the dielectric layer 15 may be a buried oxide layer of a silicon-on-insulator substrate, and the dielectric layer 15 may provide low-index and electrically-insulating cladding that separates the waveguide cores 14, 16, 18 and the photodetector 12 from the semiconductor substrate 17.

The waveguide core 14 includes a section 20 that may be disposed in the proximity of the photodetector 12. The waveguide core 16 includes a section 22 that is disposed adjacent to the section 20 of the waveguide core 14 and a section 24 that is disposed adjacent to the photodetector 12. The waveguide core 16 may include a series of bends between the section 22 and the section 24 that route the waveguide core 16 from the vicinity of the section 20 of the waveguide core 14 to the photodetector 12. The waveguide core 18 includes a section 26 that is disposed adjacent to the section 20 of the waveguide core 14 and a section 28 that is disposed adjacent to the photodetector 12. The waveguide core 18 may include a series of bends between the section 26 and the section 28 that route the waveguide core 18 from the vicinity of the section 20 of the waveguide core 14 to the photodetector 12.

The section 20 of the waveguide core 14 may terminate at an end 19, and the section 20 may be tapered with a width dimension that increases with increasing distance from the terminating end 19. In an embodiment, the width dimension of the section 20 may increase linearly with increasing distance from the end 19. In an alternative embodiment, the width dimension of the section 20 may vary based on a non-linear function, such as a quadratic function, a cubic function, a parabolic function, a sine function, a cosine function, a Bezier function, or an exponential function. In an embodiment, the section 20 may include a single stage of tapering characterized by a taper angle. In an alternative embodiment, the section 20 may taper in multiple stages each characterized by a different taper angle.

The section 22 of the waveguide core 16 may be terminated by an end 21, and the section 22 may be tapered with a width dimension that increases with increasing distance from the terminating end 21. In an embodiment, the width dimension of the section 22 may increase linearly with increasing distance from the end 21. In an alternative embodiment, the width dimension of the section 22 may vary based on a non-linear function, such as a quadratic function, a cubic function, a parabolic function, a sine function, a cosine function, a Bezier function, or an exponential function. In an embodiment, the section 22 may include a single stage of tapering characterized by a taper angle. In an alternative embodiment, the section 22 may taper in multiple stages each characterized by a different taper angle.

The section 26 of the waveguide core 16 may be terminated by an end 23, and the section 26 may be tapered with a width dimension that increases with increasing distance from the terminating end 23. In an embodiment, the width dimension of the section 26 may increase linearly with increasing distance from the end 23. In an alternative embodiment, the width dimension of the section 26 may vary based on a non-linear function, such as a quadratic function, a cubic function, a parabolic function, a sine function, a cosine function, a Bezier function, or an exponential function. In an embodiment, the section 26 may include a single stage of tapering characterized by a taper angle. In an alternative embodiment, the section 26 may taper in multiple stages each characterized by a different taper angle.

The width dimension of the section 20 increases in an opposite direction from the width dimension of the section 22 and in an opposite direction from the width dimension of the section 26. In an embodiment, the length L of the section 20 may be substantially equal to the length dimension of the section 22 and the length dimension of the section 26. The section 20 of the waveguide core 14 is separated from the section 22 of the waveguide core 16 by a gap G1. Specifically, the section 20 has a sidewall that is separated from an adjacent sidewall of the section 22 by the gap G1. The section 20 of the waveguide core 14 is separated from the section 26 of the waveguide core 18 by a gap G2. Specifically, the section 20 has a sidewall that is separated from an adjacent sidewall of the section 26 by the gap G2.

The section 20 of the waveguide core 14 may be separated from the section 22 by the gap G1 over the entire length L of the section 20 and from the section 26 by the gap G2 over the entire length L of the section 20. In an embodiment, the dimension of the gap G1 may be equal to the dimension of the gap G2. A portion of the light propagating in the waveguide core 14 may be transferred as input power across the gap G1 from the section 20 of the waveguide core 14 to the section 22 of the waveguide core 16, and a portion of the light propagating in the waveguide core 14 may be transferred as input power across the gap G2 from the section 20 of the waveguide core 14 to the section 26 of the waveguide core 16. The splitting ratio for the transferred light may be selected by adjusting factors such as the dimensions of the gaps G1, G2. In an embodiment, the transferred light may be split evenly between the section 22 and the section 26.

The photodetector 12 includes a pad 30 and a semiconductor layer 32 that is disposed on the pad 30. The section 24 adjoins a side edge 29 of the pad 30, and the section 28 adjoins a side edge 31 of the pad 30. In an embodiment, the side edge 29 may be opposite from the side edge 31, and the semiconductor layer 32 may be disposed on the pad 30 between the side edge 29 and the side edge 31 and between the section 24 and the section 28.

The section 24 of the waveguide core 16 may terminate at the side edge 29 of the pad 30, and the section 24 may be tapered with a width dimension that increases with increasing distance from the side edge 29 of the pad 30 and the semiconductor layer 32. In an embodiment, the width dimension of the section 24 may increase linearly with increasing distance from the side edge 29 of the pad 30 and the semiconductor layer 32. In an alternative embodiment, the width dimension of the section 24 may vary based on a non-linear function, such as a quadratic function, a cubic function, a parabolic function, a sine function, a cosine function, a Bezier function, or an exponential function. In an embodiment, the section 24 may include a single stage of tapering characterized by a taper angle. In an alternative embodiment, the section 24 may taper in multiple stages each characterized by a different taper angle.

The section 28 of the waveguide core 18 may terminate at the side edge 31 of the pad 30, and the section 28 may be tapered with a width dimension that increases with increasing distance from the side edge 31 of the pad 30 and the semiconductor layer 32. In an embodiment, the width dimension of the section 28 may increase linearly with increasing distance from the side edge 31 of the pad 30 and the semiconductor layer 32. In an alternative embodiment, the width dimension of the section 28 may vary based on a non-linear function, such as a quadratic function, a cubic function, a parabolic function, a sine function, a cosine function, a Bezier function, or an exponential function. In an embodiment, the section 28 may include a single stage of tapering characterized by a taper angle. In an alternative embodiment, the section 28 may taper in multiple stages each characterized by a different taper angle.

In an embodiment, the waveguide cores 14, 16, 18 and the pad 30 of the photodetector 12 may be comprised of a material having a refractive index that is greater than the refractive index of silicon dioxide. In an embodiment, the waveguide cores 14, 16, 18 and the pad 30 of the photodetector 12 may be comprised of a semiconductor material. In an embodiment, the waveguide cores 14, 16, 18 and the pad 30 of the photodetector 12 may be comprised of single-crystal silicon. The waveguide cores 14, 16, 18 and the pad 30 of the photodetector 12 may be formed by patterning a layer comprised of their constituent material with lithography and etching processes. In an embodiment, the waveguide cores 14, 16, 18 and the pad 30 of the photodetector 12 may be formed by patterning the semiconductor material (e.g., single-crystal silicon) of a device layer of a silicon-on-insulator substrate. In an alternative embodiment, the waveguide core 14 may be formed later in the process flow and may be comprised of a different material, such as a dielectric material like silicon nitride, from the material of the waveguide cores 16, 18 and the pad 30.

The semiconductor layer 32 of the photodetector 12 may be comprised of a light-absorbing material is configured to absorb light of a given wavelength and to generate charge carriers from photons of the absorbed light by photoelectric conversion. In an embodiment, the semiconductor layer 32 may be comprised of a different material from the waveguide cores 16, 18 and/or the pad 30. In an embodiment, the semiconductor layer 32 may be comprised of a material having a composition that includes germanium. In an embodiment, the semiconductor layer 32 may be comprised of intrinsic germanium. In an alternative embodiment, the semiconductor layer 32 may be comprised of a different light-absorbing material, such as a III-V compound semiconductor material or silicon.

The semiconductor layer 32 may be formed by an epitaxial growth process. In an embodiment, the semiconductor layer 32 may be epitaxially grown inside a trench that is patterned in the pad 30 such that the semiconductor layer 32 includes a lower portion disposed below a top surface of the pad 30 and an upper portion disposed above the top surface of the pad 30. In an alternative embodiment, the semiconductor layer 32 may be formed on the top surface of the pad 30, instead of inside a trench, such that the semiconductor layer 32 is disposed fully above the top surface. In this regard, the semiconductor layer 32 may be grown from the top surface of the pad 30 and then patterned by lithography and etching processes.

The waveguide cores 16, 18, and section 24 of the waveguide core 16 and the section 28 of the waveguide core 18 in particular, may have a thickness T relative to the dielectric layer 15. The semiconductor layer 32 may extend to a height H relative to the dielectric layer 15. The height H is greater than the thickness T.

The structure 10 may include a doped region 40 and a doped region 42 that are formed in respective portions of the pad 30. The doped regions 40, 42, which differ in conductivity type, may extend through the entire thickness of the pad 30 to the underlying dielectric layer 15. The semiconductor layer 32 is laterally positioned between the doped region 40 and the doped region 42. The doped region 40 and the doped region 42 may respectively define an anode and a cathode of the photodetector 12.

The doped region 40 may be formed by, for example, ion implantation with an implantation mask having an opening that determines the implanted area of the pad 30. The implantation mask may include a layer of photoresist applied by a spin-coating process, pre-baked, exposed to light projected through a photomask, baked after exposure, and developed with a chemical developer to define the opening over the area of the pad 30 to be implanted. The implantation conditions, such as ion species, dose, and kinetic energy, may be selected to tune the electrical and physical characteristics of the doped region 40. The implantation mask may be stripped after forming the doped region 40. In an embodiment, the semiconductor material of the doped region 40 may contain a p-type dopant, such as boron, that provides p-type electrical conductivity. In an alternative embodiment, a portion of the semiconductor layer 32 immediately adjacent to the doped region 40 and an underlying portion of the pad 30 may be implanted with the p-type dopant due to overlap of the opening in the implantation mask.

The doped region 42 may be formed by, for example, ion implantation with an implantation mask with an opening that determines an implanted area of the pad 30. The implantation mask may include a layer of photoresist applied by a spin-coating process, pre-baked, exposed to light projected through a photomask, baked after exposure, and developed with a chemical developer to define the opening over the area of the pad 30 to be implanted. The implantation conditions, such as ion species, dose, and kinetic energy, may be selected to tune the electrical and physical characteristics of the doped region 42. The implantation mask may be stripped after forming the doped region 42. In an embodiment, the semiconductor material of the doped region 42 may contain an n-type dopant, such as phosphorus or arsenic, that provides n-type electrical conductivity. In an alternative embodiment, a portion of the semiconductor layer 32 immediately adjacent to the doped region 42 and an underlying portion of the pad 30 may be implanted with the n-type dopant due to overlap of the opening in the implantation mask.

A portion of the pad 30 beneath the semiconductor layer 32 may be comprised of intrinsic semiconductor material, such as intrinsic silicon, that is not doped by the ion implantation forming the doped regions 40, 42. The section 20 may be aligned lengthwise with the intrinsic portion of the pad 30. In an embodiment, the intrinsic portion of the pad 30 may extend from the side edge 29 of the pad 30 to the side edge 31 of the pad 30. The doped region 40, the intrinsic semiconductor materials of the semiconductor layer 32 and the portion of the pad 30 beneath the semiconductor layer 32, and the doped region 42 may define a lateral p-i-n diode structure that provides the functionality of the photodetector 12.

A heavily-doped region 41 may be formed by a masked ion implantation in a portion of the doped region 40. The heavily-doped region 41 may be doped to the same conductivity type as the doped region 40 but at a higher dopant concentration. A heavily-doped region 43 may be formed by a masked ion implantation in a portion of the doped region 42. The heavily-doped region 43 may be doped to the same conductivity type as the doped region 42 but at a higher dopant concentration.

In an alternative embodiment, the photodetector 12 may have a vertical arrangement instead of a lateral arrangement. Specifically, in the vertical arrangement, the doped region 40 and heavily-doped region 41 may be arranged in the pad 30 on both sides of the semiconductor layer 32, and the doped region 42 and heavily-doped region 43 may be arranged in the semiconductor layer 32. In an alternative embodiment, the structure 10 may be configured with the doped region 40 in the pad 30 only adjacent to one side of the semiconductor layer 32. In an alternative embodiment, the photodetector 12 may be configured as an avalanche photodetector that includes an intrinsic semiconductor region in the pad 30 defining a multiplication region and an additional doped region in the pad 30 defining a charge control region.

With reference to FIGS. 3, 4, 4A, 4B in which like reference numerals refer to like features in FIGS. 1, 2, 2A, 2B and at a subsequent fabrication stage, a dielectric layer 44 is formed over the photodetector 12 and waveguide cores 14, 16, 18. The dielectric layer 44 may be comprised of a dielectric material, such as silicon dioxide, having a refractive index that is less than the refractive index of the material constituting the waveguide cores 14, 16, 18. The dielectric layer 44 may conformally coat the photodetector 12 and waveguide cores 14, 16, 18.

The structure 10 further includes waveguide cores 46, 48 that are positioned on, and above, the dielectric layer 44. The waveguide core 46 is stacked with the waveguide core 16 to define a multiple-layer stacked waveguide core. The waveguide core 48 is stacked with the waveguide core 18 to define a multiple-layer stacked waveguide core. The stacked waveguide core including the waveguide core 16 and the waveguide core 46 is routed from the section 20 of the waveguide core 14 to the photodetector 12. The stacked waveguide core including the waveguide core 18 and the waveguide core 48 is routed from the section 20 of the waveguide core 14 to the photodetector 12.

The waveguide core 46 includes a section 52 that is disposed over the section 22 of the waveguide core 16 and adjacent to the section 20 of the waveguide core 14. The waveguide core 46 includes a section 54 that is disposed over the section 24 of the waveguide core 16 and adjacent to the photodetector 12. In an embodiment, the section 54 may have a top surface 65 that is coplanar or substantially coplanar with the top surface 33 of the semiconductor layer 32. The waveguide core 48 includes a section 56 that is disposed over the section 26 of the waveguide core 18 and adjacent to the section 20 of the waveguide core 14. The waveguide core 48 includes a section 58 that is disposed over the section 28 of the waveguide core 18 and adjacent to the photodetector 12. In an embodiment, the section 58 may have a top surface 69 that is coplanar or substantially coplanar with the top surface 33 of the semiconductor layer 32.

The section 52 of the waveguide core 46 may be terminated by an end 53, and the section 52 may be tapered with a width dimension that increases with increasing distance from the terminating end 53. In an embodiment, the width dimension of the section 52 may increase linearly with increasing distance from the end 53. In an alternative embodiment, the width dimension of the section 52 may vary based on a non-linear function, such as a quadratic function, a cubic function, a parabolic function, a sine function, a cosine function, a Bezier function, or an exponential function. In an embodiment, the section 52 may include a single stage of tapering characterized by a taper angle. In an alternative embodiment, the section 52 may taper in multiple stages each characterized by a different taper angle.

The section 54 of the waveguide core 46 may be terminated by an end 55, and the section 54 may be tapered with a width dimension that increases with increasing distance from the terminating end 55 and the semiconductor layer 32. In an embodiment, the width dimension of the section 54 may increase linearly with increasing distance from the end 55 and the semiconductor layer 32. In an alternative embodiment, the width dimension of the section 54 may vary based on a non-linear function, such as a quadratic function, a cubic function, a parabolic function, a sine function, a cosine function, a Bezier function, or an exponential function. In an embodiment, the section 54 may include a single stage of tapering characterized by a taper angle. In an alternative embodiment, the section 54 may taper in multiple stages each characterized by a different taper angle. The end 55 of the section 54 may coincide with the side edge 29 of the pad 30.

The section 56 of the waveguide core 48 may be terminated by an end 57 and may be tapered with a width dimension that increases with increasing distance from the terminating end 57. In an embodiment, the width dimension of the section 56 may increase linearly with increasing distance from the end 57. In an alternative embodiment, the width dimension of the section 56 may vary based on a non-linear function, such as a quadratic function, a cubic function, a parabolic function, a sine function, a cosine function, a Bezier function, or an exponential function. In an embodiment, the section 56 may include a single stage of tapering characterized by a taper angle. In an alternative embodiment, the section 56 may taper in multiple stages each characterized by a different taper angle.

The section 58 of the waveguide core 48 may be terminated by an end 59 and may have a width dimension that increases with increasing distance from the terminating end 59 and the semiconductor layer 32. In an embodiment, the width dimension of the section 58 may increase linearly with increasing distance from the end 59 and the semiconductor layer 32. In an alternative embodiment, the width dimension of the section 58 may vary based on a non-linear function, such as a quadratic function, a cubic function, a parabolic function, a sine function, a cosine function, a Bezier function, or an exponential function. In an embodiment, the section 58 may include a single stage of tapering characterized by a taper angle. In an alternative embodiment, the section 58 may taper in multiple stages each characterized by a different taper angle. The end 59 of the section 58 may coincide with the side edge 31 of the pad 30.

The waveguide core 46 may include a series of bends between the section 52 and the section 54. The waveguide core 48 may include a series of bends between the section 56 and the section 58. The bends of the waveguide cores 46, 48 route the waveguide cores 46, 48 respectively over the waveguide cores 16, 18 from the vicinity of the section 20 of the waveguide core 14 to the vicinity of the photodetector 12. The bends of the waveguide cores 46, 48 also enable an overlap between the waveguide core 46 and the waveguide core 16 and an overlap between the waveguide core 48 and the waveguide core 18 over their routing from the section 20 of the waveguide core 14 to the photodetector 12. In an embodiment, the respective overlapping relationships in the routing may result in a full overlap between the waveguide core 46 and the waveguide core 16 and a full overlap between the waveguide core 48 and the waveguide core 18. In an embodiment, the respective overlapping relationships may symmetrically dispose the waveguide core 46 over the waveguide core 16 over the length of the waveguide core 16 and may symmetrically dispose the waveguide core 48 over the waveguide core 18 over the length of the waveguide core 18. In an embodiment, the waveguide core 46 may be narrower in width dimension than the waveguide core 16, and the waveguide core 48 may be narrower in width dimension than the waveguide core 18.

In an embodiment, the waveguide cores 46, 48 may be comprised of a material having a refractive index that is greater than the refractive index of silicon dioxide. In an embodiment, the waveguide cores 46, 48 may be comprised of a different material from the waveguide cores 16, 18. In an embodiment, the waveguide cores 46, 48 may be comprised of a semiconductor material, such as polysilicon or amorphous silicon. In an embodiment, the waveguide cores 46, 48 may be comprised of a dielectric material, such as silicon nitride. The waveguide cores 46, 48 may be formed by depositing a layer comprised of their constituent material and patterning the deposited layer with lithography and etching processes.

The section 54 of the waveguide core 46 in the multiple-layer stacked waveguide core including the waveguide core 16 provides a photonic coupler that compensates for the difference between the height of the semiconductor layer 32 and the thickness T of the section 24 of the waveguide core 16. The section 58 of the waveguide core 48 in the multiple-layer stacked waveguide core including the waveguide core 18 provides another photonic coupler that compensates for the difference between the height of the semiconductor layer 32 and the thickness T of the section 28 of the waveguide core 16. As a result, the sections 24, 26 of the waveguide cores 46, 48 may assist with the coupling of light into the semiconductor layer 32 of the photodetector 12.

Figure 5:
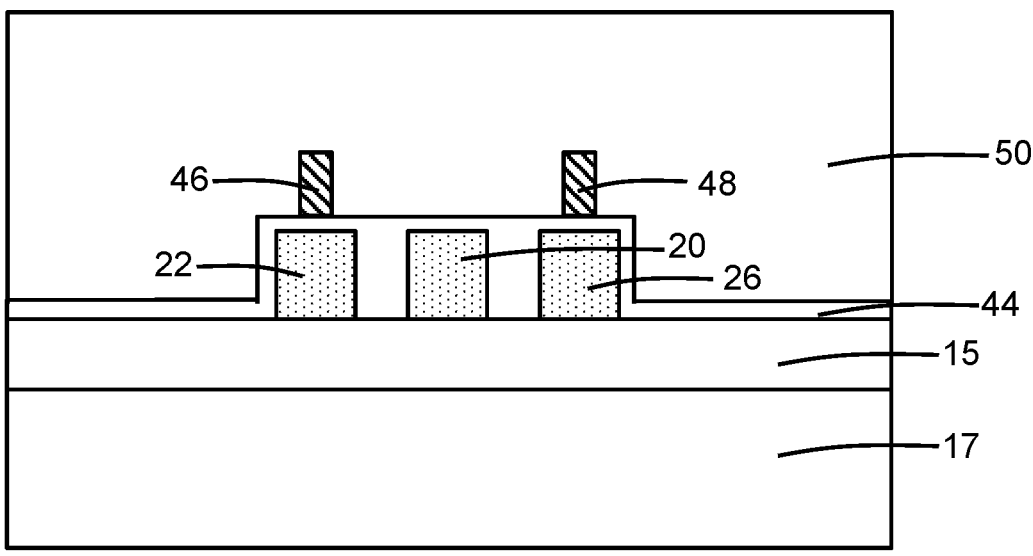
FIGS. 5, 5A, 5B are cross-sectional views of the structure at a fabrication stage of the processing method subsequent to FIGS. 3, 4, 4A, 4B.
Figure 5A:
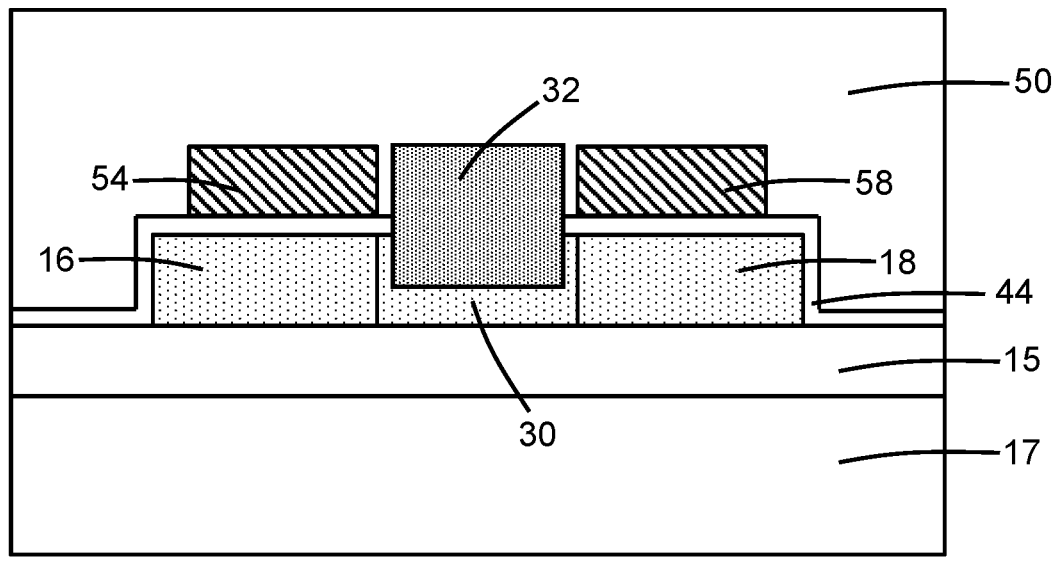
Figure 5B:
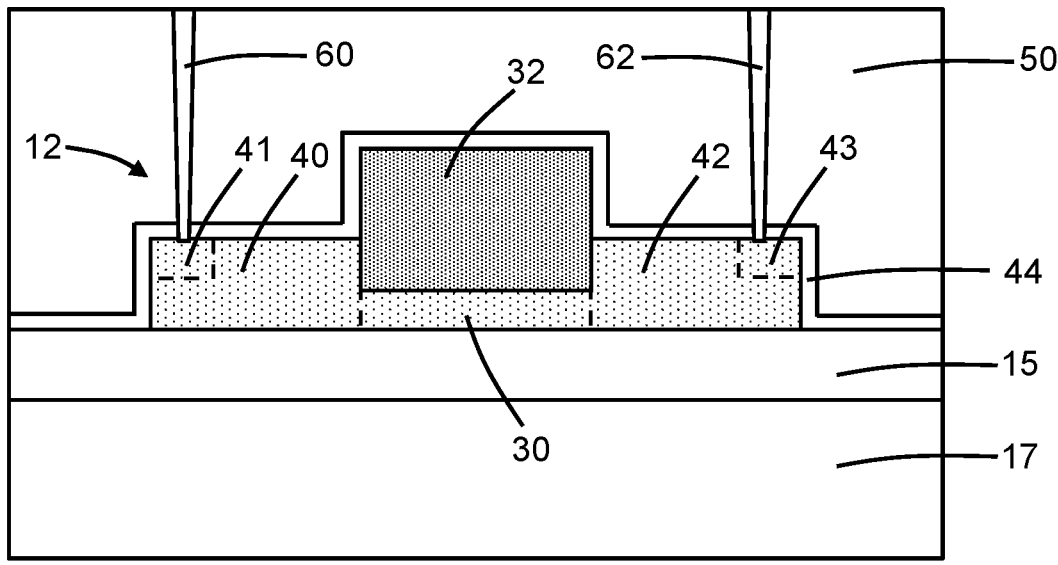

With reference to FIGS. 5, 5A, 5B in which like reference numerals refer to like features in FIGS. 3, 4, 4A, 4B and at a subsequent fabrication stage, a dielectric layer 50 may be formed over the dielectric layer 44 and the waveguide cores 46, 48. The dielectric layer 50 may be comprised of a dielectric material, such as silicon dioxide, having a refractive index that is less than the refractive index of the material constituting the waveguide core 46, 48.

Contacts 60 may be formed in the dielectric layer 50 that penetrate through the dielectric layer 44 to land on the heavily-doped region 41, and contacts 62 may be formed in the dielectric layer 50 that penetrate through the dielectric layer 44 to land on the heavily-doped region 43. The heavily-doped region 41 electrically couples the contacts 60 to the doped region 40. The heavily-doped region 43 electrically couples the contacts 62 to the doped region 42. The contacts 60, 62 may be comprised of a metal, such as tungsten. The doped regions 40, 42 may be electrically biased through the heavily-doped regions 41, 43 and the contacts 60, 62.

In use, light (e.g., laser light) propagates in the waveguide core 14 toward the section 20 and is coupled from the section 20 of the waveguide core 14 to the section 22 of the waveguide core 16 and to the section 26 of the waveguide core 18 with a given splitting ratio associated with a photonic coupler. Unlike conventional photonic couplers, the splitting may be insensitive to the polarization of the light such that light characterized by transverse electric polarization is split with the splitting ratio between the sections 20 and 22, and light characterized by transverse magnetic polarization is also split with the splitting ratio between the sections 20 and 26. The waveguide core 16 routes the transferred light to the semiconductor layer 32 of the photodetector 12, and the section 24 of the waveguide core 16 provides an input to the photodetector 12 with assistance from the section 54 of the waveguide core 46. The waveguide core 18 routes the transferred light to the semiconductor layer 32 of the photodetector 12, and the section 28 of the waveguide core 18 provides an input to the photodetector 12 with assistance from the section 58 of the waveguide core 48. Both waveguide cores 16, 18 concurrently provide light to the photodetector 12 independent of polarization. In an embodiment, the light received by the photodetector 12 may be modulated as an optical signal. The semiconductor layer 32 of the photodetector 12 absorbs photons of the light and converts the absorbed photons into charge carriers by photoelectric conversion. The biasing of the doped regions 40, 42 causes the charge carriers to be collected and output through the contacts 60, 62 to provide, as a function of time, a measurable photocurrent.

The structure 10 features a polarization-insensitive photonic coupler that includes the section 20 of the waveguide core 14, the section 22 of the waveguide core 16, and the section 26 of the waveguide core 18. The photonic coupler splits the optical power of the light from the waveguide core 14 to the waveguide cores 16, 18. The overlap of the section 52 of the waveguide core 46 with the section 22 of the waveguide core 16 and the overlap of the section 56 of the waveguide core 48 with the section 26 of the waveguide core 18 may assist with the splitting of the optical power by reducing or eliminating any dependence upon the polarization of the input light.

The structure 10 features a polarization-insensitive photonic coupler that includes the stacked waveguide core including the stacked and overlapped sections 24, 54 of the waveguide cores 16, 46, and a polarization-insensitive photonic coupler that includes the stacked and overlapped sections 28, 58 of the waveguide cores 18, 48. The sections 24, 54 and the sections 28, 58 of the waveguide cores 46, 48 may assist with the coupling of light, such as light having a transverse magnetic polarization, into the semiconductor layer 32 of the photodetector 12, which may significantly reduce polarization dependent loss and any associated impact upon the responsivity of the photodetector 12. As a result, saturation of the dual-input photodetector 12 is averted.

Additionally, the structure 10 may have a compact footprint that contrasts with a polarization splitter rotator that may be used conventionally in a photonic integrated circuit to input power into a photodetector. The compact footprint may be attributed to the overlapped waveguide cores 16, 46 and the overlapped waveguide cores 18, 48.

Figure 6:
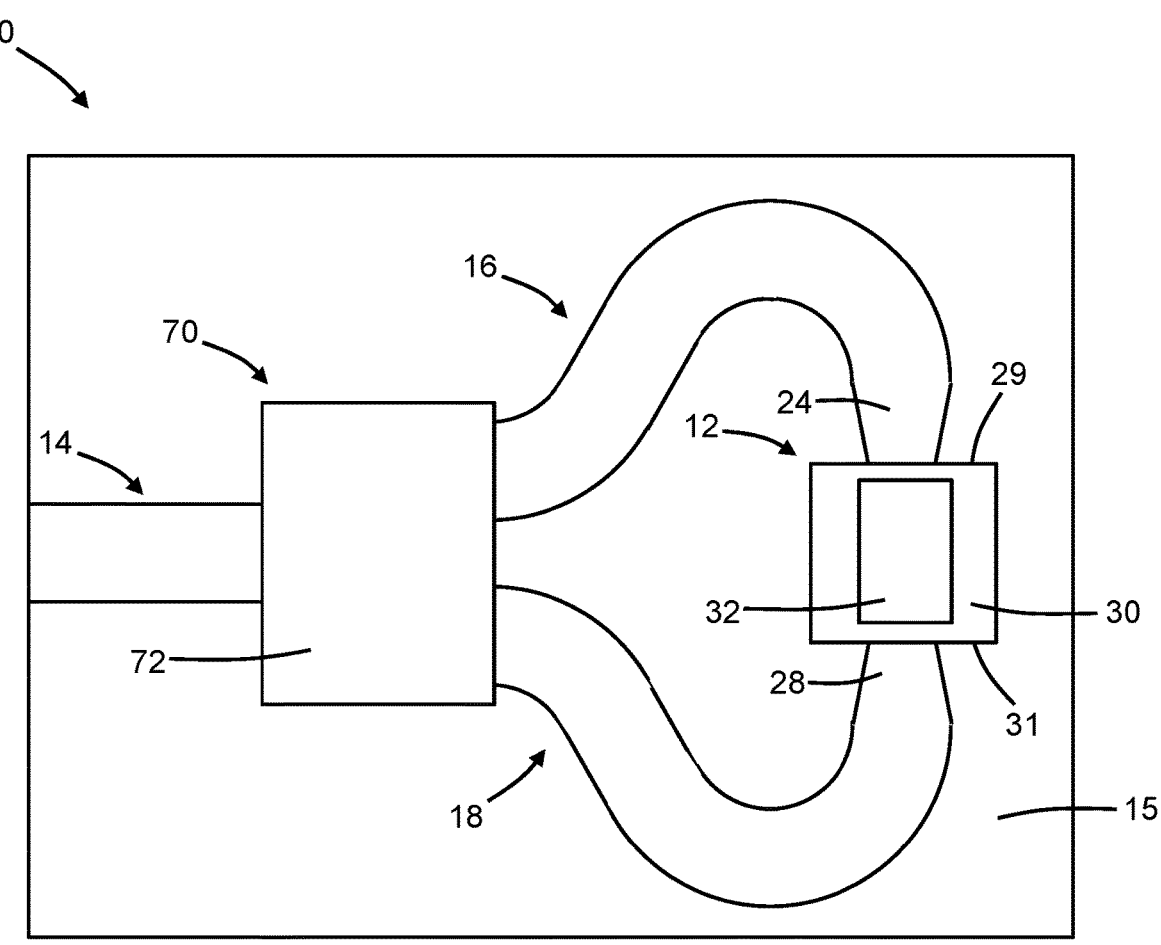
FIG. 6 is a top view of a structure at an initial fabrication stage of a processing method in accordance with embodiments of the invention.

With reference to FIG. 6 and in accordance with alternative embodiments, the structure 10 may be modified such that the photonic coupler defined by the section 20 of the waveguide core 14, the section 22 of the waveguide core 16, and the section 26 of the waveguide core 18 is replaced by a multi-mode interference coupler 70. In an embodiment, the multi-mode interference coupler 70 may include a multi-mode interference region 72 with an input port connected to the waveguide core 14, an output port coupled to the waveguide core 16, and an output port coupled to the waveguide core 18. The waveguide core 14 may be directly coupled to the input port of the multi-mode interference region 72, and the waveguide cores 16, 18 may be directly coupled to the output ports of the multi-mode interference region 72. The multi-mode interference region 72 is configured to split the light received from the waveguide core 14 between the waveguide core 16 and the waveguide core 18.

Figure 7:
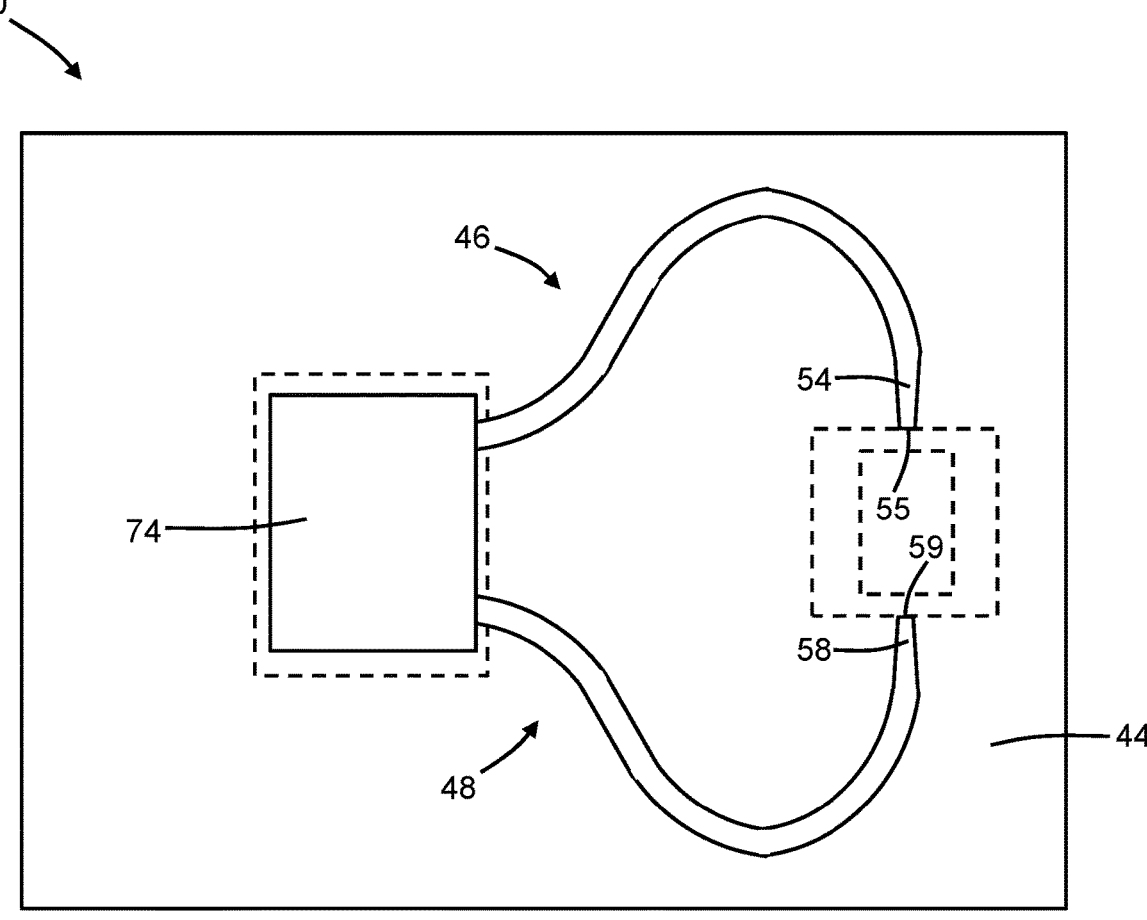
FIG. 7 is a top view of the structure at a fabrication stage of the processing method subsequent to FIG. 6.

With reference to FIG. 7 in which like reference numerals refer to like features in FIG. 6 and at a subsequent fabrication stage, the waveguide cores 46, 48 may be modified to include a shared slab layer 74 that is disposed over the multi-mode interference region 72 of the multi-mode interference coupler 70. The slab layer 74 replaces the section 52 of the waveguide core 46 and the section 56 of the waveguide core 48. The bends of the waveguide core 46 are connected to the slab layer 74 and the bends of the waveguide core 48 are also connected to the slab layer 74.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value or, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a photodetector;
   a first waveguide core coupled to the photodetector, the first waveguide core including a first section;
   a second waveguide core coupled to the photodetector, the second waveguide core including a first section; and
   a third waveguide core including a section disposed laterally between the first section of the first waveguide core and the first section of the second waveguide core,
   wherein the photodetector includes a semiconductor layer configured to absorb light of a given wavelength, the first waveguide core includes a second section adjacent to the semiconductor layer of the photodetector, and the second waveguide core includes a second section adjacent to the semiconductor layer of the photodetector.

2. The structure of claim 1 wherein the semiconductor layer of the photodetector is disposed laterally between the second section of the first waveguide core and the second section of the second waveguide core.

3. The structure of claim 1 wherein the first section of the first waveguide core, the first section of the second waveguide core, and the first section of the third waveguide core are included in a photonic coupler, the photonic coupler is configured to split light with transverse electric polarization with a splitting ratio between the first section of the first waveguide core and the first section of the second waveguide core, and the photonic coupler is configured to split light with transverse magnetic polarization with the splitting ratio between the first section of the first waveguide core and the first section of the second waveguide core.

4. The structure of claim 1 wherein the first section of the first waveguide core is tapered and terminates at a first end, the first section of the second waveguide core is tapered and terminates at a second end, the first section of the third waveguide core is tapered and terminates at a third end, the first section of the third waveguide core is tapered in an opposite direction from the first section of the first waveguide core, and the first section of the third waveguide core is tapered in an opposite direction from the first section of the second waveguide core.

5. The structure of claim 4 wherein the first section of the first waveguide core is spaced from the first section of the third waveguide core by a first gap, and the first section of the first waveguide core is spaced from the first section of the third waveguide core by a second gap.

6. The structure of claim 1 wherein the first waveguide core comprises silicon, the third waveguide core comprises silicon, and the third waveguide core comprises silicon.

7. The structure of claim 1 wherein the first waveguide core comprises silicon, the third waveguide core comprises silicon, and the third waveguide core comprises silicon nitride.

8. The structure of claim 1 wherein the semiconductor layer comprises germanium.

9. The structure of claim 1 wherein the semiconductor layer comprises a III-V compound semiconductor material.

10. The structure of claim 1 wherein the semiconductor layer comprises silicon.

11. The structure of claim 1 further comprising:
   a fourth waveguide core including a section that overlaps with the first section of the first waveguide core; and
   a fifth waveguide core including a section that overlaps with the first section of the second waveguide core.

12. The structure of claim 11 wherein the fourth waveguide core and the fifth waveguide core comprise polysilicon or amorphous silicon.

13. The structure of claim 12 wherein the first waveguide core comprises silicon, the fourth waveguide core comprises silicon, and the fourth waveguide core comprises silicon.

14. The structure of claim 11 wherein the fourth waveguide core and the fifth waveguide core comprise silicon nitride.

15. The structure of claim 14 wherein the first waveguide core comprises silicon, the fourth waveguide core comprises silicon, and the fourth waveguide core comprises silicon.

16. The structure of claim 11 wherein the first section of the first waveguide core is tapered, and the section of the fourth waveguide core is tapered.

17. The structure of claim 11 wherein the first section of the second waveguide core is tapered, and the section of the fifth waveguide core is tapered.

18. The structure of claim 1 further comprising:
   a fourth waveguide core that overlaps with the first section of the first waveguide core; and
   a fifth waveguide core that overlaps with the first section of the second waveguide core.

19. The structure of claim 18 wherein the fourth waveguide core and the fifth waveguide core comprise polysilicon, amorphous silicon, or silicon nitride.

20. A method of forming a structure for a photonics chip, the method comprising:
   forming a photodetector;
   forming a first waveguide core coupled to the photodetector;
   forming a second waveguide core coupled to the photodetector; and
   forming a third waveguide core including a section disposed laterally between a first section of the first waveguide core and a first section of the second waveguide core,
   wherein the photodetector includes a semiconductor layer configured to absorb light of a given wavelength, the first waveguide core includes a second section adjacent to the semiconductor layer of the photodetector, and the second waveguide core includes a second section adjacent to the semiconductor layer of the photodetector.

* * * * *